United States Patent Office 3,530,150
Patented Sept. 22, 1970

3,530,150
PROCESS FOR THE MANUFACTURE OF
1 - AMINO - 2 - HYDROXYALKOXY - 4 -
HYDROXY-ANTHRAQUINONES
Hans Rudolf Rickenbacher, Basel, Switzerland, assignor to Ciba Limited, Basel, Switzerland, a Swiss company
No Drawing. Filed Aug. 10, 1966, Ser. No. 571,432
Claims priority, application Switzerland, Aug. 13, 1965, 11,400/65
Int. Cl. C09b 1/54; C07c 97/14
U.S. Cl. 260—380                    7 Claims

ABSTRACT OF THE DISCLOSURE

1 - amino-2 hydroxyalkoxy-4-hydroxy-anthra-quinones are prepared by heating 1 - amino - 2-chloro-4-hydroxy-anthraquinone with a glycol in the presence of an alkali metal hydroxide.

---

It has been proposed to prepare 1-amino-2-hydroxy-alkoxy-4-hydroxyanthraquinones by reacting 1-amino-2-bromo-4-hydroxyanthraquinone with a glycol in the presence of an alkali metal hydroxide (cf. British Pat. No. 558,433, granted July 1, 1942 to Imperial Chemical Industries Limited, London, Great Britain). However, almost insoluble problems arise when large batches are to be manufactureded by this process, because about 20 to 30% of 1-amino-4-hydroxy-anthraquinone is produced as a by-product of the reaction. This substance is very difficult to separate from the main product and it has a highly deleterious effect on the purity of the dyeings. It is therefore not surprising that the process described in German Pat. No. 1,083,960, granted June 23, 1960 to Sandoz A. G., Basel, Switzerland, makes use of 1-amino-4-hydroxyanthraquinone-2-sulphonic acid as starting material for the manufacture of 1-amino-2-alkoxyalkoxy-4-hydroxyanthraquinones, in spite of the fact that it is considerably more expensive than 1-amino-2-bromo-4-hydroxyanthraquinone.

The present invention is based on the surprising observation that the above-mentioned difficulties can be overcome very simply and that a very pure 1-amino-2-hydroxyalkoxy-4-hydroxyanthraquinone or a 1-amino-2-alkoxyalkoxy-4-hydroxyanthraquinone is obtainable when 1-amino-2-chloro-4-hydroxyanthraquinone is heated with a glycol or a glycol ether in the presence of an alkali metal hydroxide.

The 1-amino-2-chloro-4-hydroxyanthraquinone used as the starting material can be prepared by a method known per se by heating 1-amino-2,4-dichloronthraquinone with anhydrous sulphuric acid or oleum in the presence of boric acid.

The glycols or glycol ethers used in the process of the invention advantageously correspond to the formula $$HO[(CH_2)_mO]_nR$$

in which R represents a hydrogen atom or an alkyl group, $m$ represents an integer within the range of from 2 to 6 and $n$ represents an integer within the range of from 1 to 3.

One example of a glycol that may be mentioned because of its ready availability is ethylene glycol; other examples of glycols and glycol ethers are 1,3-propyleneglycol, 1,2-propyleneglycol, 1,4-butyleneglycol, 1,3-butyleneglycol, 1,5-pentyleneglycol, 1,6-hexyleneglycol, ethyleneglycolmonoethylether, ethyleneglycolmonoethylether, diethyleneglycol, triethyleneglycol, diethyleneglycolmonoethylether, diethyleneglycolmonobutylether, diethyleneglycolmonohexylether and triethyleneglycolmonomethylether.

The glycol or glycol ether is advantageously used in a large excess and in this case act as both reactant and solvent. Accordingly, it is advantageous to use at least 10 parts of the glycol or glycol ether to 1 part of the aminochlorohydroxyanthraquinone.

The alkali metal hydroxides used are, especially sodium or potassium hydroxide, and they are preferably employed in an amount of at least 2 mols per mol of aminochlorohydroxyanthraquinone. The reaction is advantageously carried out at a temperature within the range of from 100 to 150° C. with the exclusion of water.

The reaction product can be isolated from the solvent by filtration. It is generally of advantage to wash the reaction product with water until it has a neutral reaction in order to remove the alkali metal hydroxides and alkali metal chlorides.

The dyestuffs so obtained are distinguished by great purity of tint. There are no by-products present to impair the purity of the tint even when large batches are manufactured, or if, in some isolated cases, by-products are present they can easily be removed.

The following examples illustrate the invention. Unless otherwise stated, the parts and percentages are by weight.

EXAMPLE 1

82.2 parts of 1-amino-2-chloro-4-hydroxyanthraquinone are introduced into a solution of 22.1 parts of 90% potassium hydroxide in 660 parts of ethyleneglycol having a temperature of 30° C., while stirring. The mixture is heated to a temperature within the range of from 117 to 122° C. during one hour and is maintained at that temperature for 6 hours. The suspension is cooled to 20° C., filtered, and the filter residue is washed successively with 160 parts of ethyleneglycol and cold water, the washing with cold water being continued until the filtrate runs neutral. 70.0 parts of dyestuff are obtained in the form of a brown powder. The product is almost pure 1-amino-2 - (2'-hydroxyethoxy)-4-hydroxyanthraquinone; in particular, it contains no 1-amino-4-hydroxyanthraquinone.

The dyestuff produces pure pink tints on nylon and polyester fibres when applied in the form of an aqueous dispersion.

EXAMPLE 2

A mixture comprising 500 parts of 1,2-propanediol, 11.3 parts of 90% potassium hydroxide and 27.4 parts of 1-amino-2-chloro-4-hydroxy-anthraquinone is heated to a temperature within the range of from 120 to 125° C. in a flask provided with stirring means, thermometer and reflux condenser, and the mixture is kept at that temperature for 5 hours. 500 parts of water and 20 parts of acetic acid are then added and the precipitated dyestuff is isolated by suction filtration. The press-cake is washed with 50 parts of a 1:1 mixture of propanediol and water and then with water until the filtrate runs neutral. The product of the reaction is obtained in a yield of 25.6 parts in the form of a dark brown powder. It is purified by recrystallization from nitrobenzene with filtration of the hot solution, a unitary (thin-layer chromatogram) dyestuff having the formula

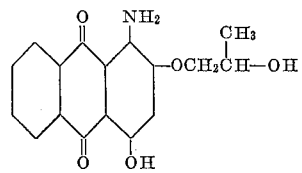

being obtained.

*Analysis.*—Calculated (percent): N, 4.49. Found (percent): N, 4.72.

The dyestuff has affinity for cellulose acetate, nylon and polyester fibres when applied in the form of an aqueous dispersion and dyes the said fibres strong, bluish pink tints. Dyeings on polyester fibres display a good fastness to light and to sublimation.

EXAMPLE 3

A mixture comprising 500 parts of 1,4-dihydroxybutane, 11.3 parts of 90% potassium hydroxide and 27.4 parts of 1-amino-2-chloro-4-hydroxyanthraquinone is heated to a temperature within the range of from 120 to 125° C. in a flask provided with stirring means, thermometer and reflux condenser, and the mixture is kept at that temperature for 5 hours. Working up in a manner similar to that described in Example 2 produces the reaction product in a yield of 22.5 parts in the form of a dark brown powder.

Recrystallization from chlorobenzene, the hot solution being filtered, produces the unitary dyestuff (thin-layer chromatogram) of the formula

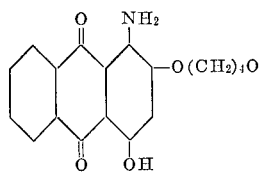

*Analysis.*—Calculated (percent): N, 4.29. Found (percent): N, 4.47.

The dyestuff has affinity for cellulose acetate, nylon and polyester fibres when applied in the form of an aqueous dispersion. Dyeings on polyester fibres display a good fastness to light and to sublimation.

EXAMPLE 4

A mixture comprising 500 parts of ethyleneglycolmonomethylether, 11.3 parts of 90% potassium hydroxide and 27.4 parts of 1-amino-2-chloro-4 - hydroxyanthraquinone is heated to a temperature within the range of from 120 to 125° C. in a flask provided with stirring means like the one described in Example 2, and the mixture is kept at that temperature for 5 hours. 250 parts of water are added to precipitate the dyestuff of the formula

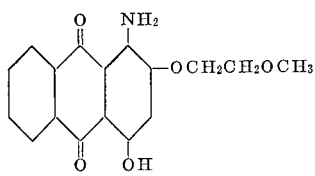

The dyestuff is isolated by filtration and the press-cake is washed with 50 parts of a 2:1 mixture of ethyleneglycol-monomethylether and water and then with water until the filtrate runs neutral. The product of the reaction is obtained in a yield of 22 parts in the form of a brown-orange powder. Even the crude product is unitary (thin-layer chromatogram).

*Analysis.*—Calculated (percent): N, 4.49. Found (percent): N, 4.41.

The dyestuff dyes cellulose acetate and polyester fibres yellowish pink tints and nylon fibres bluish pink tints when applied in the form of an aqueous dispersion. The dyeings possess a very good fastness to light.

EXAMPLE 5

A mixture comprising 500 parts of diethyleneglycol, 22.6 parts of 90% potassium hydroxide and 27.4 parts of 1-amino-2-chloro-4-hydroxyanthraquinone is heated to a temperature within the range of from 120 to 125° C. in a flask provided with stirring means, thermometer and reflux condenser, and the mixture is kept at that temperature for 5 hours. The addition of 500 parts of water and 40 parts of glacial acetic acid precipitates the dyestuff of the formula

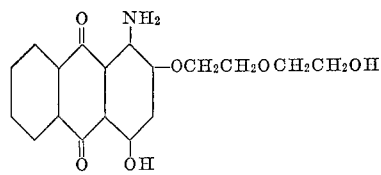

The dyestuff is isolated by suction filtration and the press-cake is washed with 50 parts of a 1:1 mixture of diethyleneglycol and water and then with water until the filtrate runs neutral. The product of the reaction is obtained in a yield of 21.8 parts in the form of a dark brown powder. Recrystallization from chlorobenzene, with filtration of the hot solution, yields a unitary product (thin-layer chromatogram).

*Analysis.*—Calculated (percent): N, 4.09. Found (percent): N, 4.17.

The dyestuff dyes cellulose acetate, nylon and polyester fibres pink tints when applied in the form of an aqueous dispersion. Dyeings on polyester fibres display a good fastness to light and to sublimation.

EXAMPLE 6

A mixture comprising 500 parts of diethyleneglycolmonomethylether, 16.8 parts of 90% potassium hydroxide and 27.4 parts of 1-amino-2-chloro-4-hydroxyanthraquinone is heated to a temperature within the range of from 120 to 125° C. in a flask provided with stirring means, thermometer and reflux condenser, and the mixture is kept at that temperature for 8 hours. 500 parts of water are added to precipitate the dyestuff of the formula

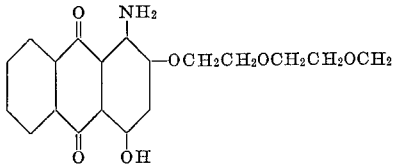

The dyestuff is isolated by suction filtration and the press-cake is washed with 50 parts of a 1:1 mixture of diethyleneglyclomonomethylether and water and then with water until the filtrate runs neutral. The product is obtained in a yield of 25.2 parts in the form of a red-brown powder. Purification is effected by recrystallization from glacial acetic acid, with filtration of the hot, saturated solution.

*Analysis.*—Calculated (percent): N, 3.93. Found (percent): N, 4.15.

The dyestuff dyes cellulose acetate, nylon and polyester fibres pure pink tints possessing a good fastness to light when applied in the form of an aqueous dispersion.

EXAMPLE 7

A mixture comprising 500 parts of 1,3-butanediol, 14.3 parts of 90% potassium hydroxide and 27.4 parts of 1-amino-2-chloro-4-hydroxyanthraquinone is heated to a temperature within the range of from 130 to 135° C. in a flask provided with stirring means, thermometer and reflux condenser, and the mixture is kept at that temperature for 8 hours. The addition of 500 parts of water and 30 parts of glacial acetic acid precipitates the product and it is isolated by suction filtration; the residue is washed with 50 parts of a 1:1 mixture of 1,3-butanediol and water and then with water until the filtrate runs neutral. The product is obtained in a yield of 28 parts in the form of a dark brown powder. Purification is effected by dissolving the product in 600 parts of boiling chlorobenzene, isolating insoluble matter by filtration and then subjecting the filtrate to steam distillation, the purified dyestuff of the formula

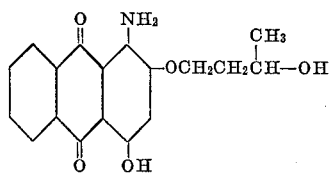

being obtained in a yield of 18 parts.

*Analysis.*—Calculated (percent): N, 4.29. Found (percent): N, 4.01.

The dyestuff dyes cellulose acetate, nylon and polyester fibres pink tints when applied in the form of an aqueous dispersion.

What is claimed is:

1. A process for the manufacture of 1-amino-2-hydroxyalkoxy- or 1-amino-2-alkoxyalkoxy-4-hydroxyanthraquinone by heating 1-amino-2-chloro-4-hydroxyanthraquinone with a glycol or a glycol ether of the formula $$HO[(CH_2)_mO]_nR$$

in which formula R represents a hydrogen atom or an alkyl group, $m$ represents an integer of 2 to 6 and $n$ represents an integar of 1 to 3 in the presence of an alkali metal hydroxide.

2. A process as claimed in claim 1, wherein ethyleneglycol is used as the glycol.

3. A process as claimed in claim 1, wherein an excess of the glycol or the glycol ether is used as reaction medium.

4. A process as claimed in claim 3, wherein at least 10 parts of the glycol or glycol ether to 1 part of the aminochlorohydroxyanthraquinone is used.

5. A process as claimed in claim 1, wherein the alkali metal hydroxide is used in an amount of at least 2 mols per mol of aminochlorohydroxyanthraquinone.

6. A process as claimed in claim 5, wherein the alkali metal hydroxide used is sodium hydroxide or potassium hydroxide.

7. A process as claimed in claim 1, wherein the reaction is carried out at a temperature within the range of from 100 to 150° C. with the exclusion of water.

References Cited

UNITED STATES PATENTS 3,264,325  8/1966  Lewis _____ 260—380

LORRAINE A. WEINBERGER, Primary Examiner

R. GERSTL, Assistant Examiner

U.S. Cl. X.R.

8—39, 40